March 11, 1969 — F. R. KINNAN — 3,431,741
ARTICULATED VEHICLE
Filed Sept. 26, 1966 — Sheet 1 of 4
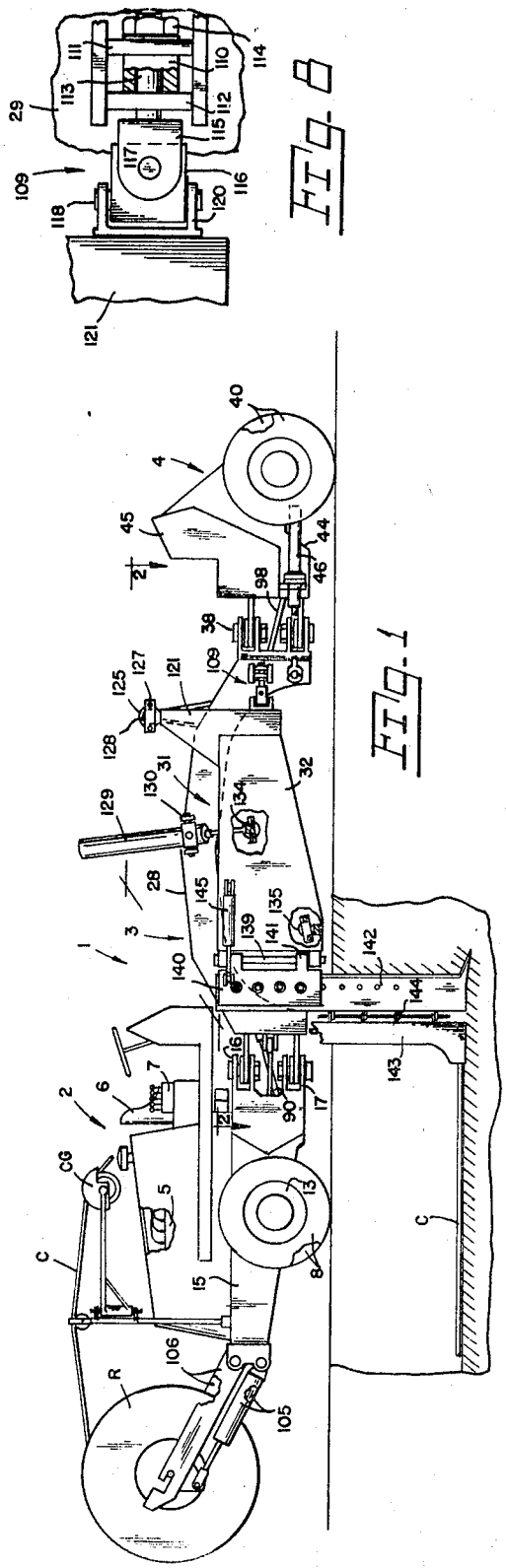
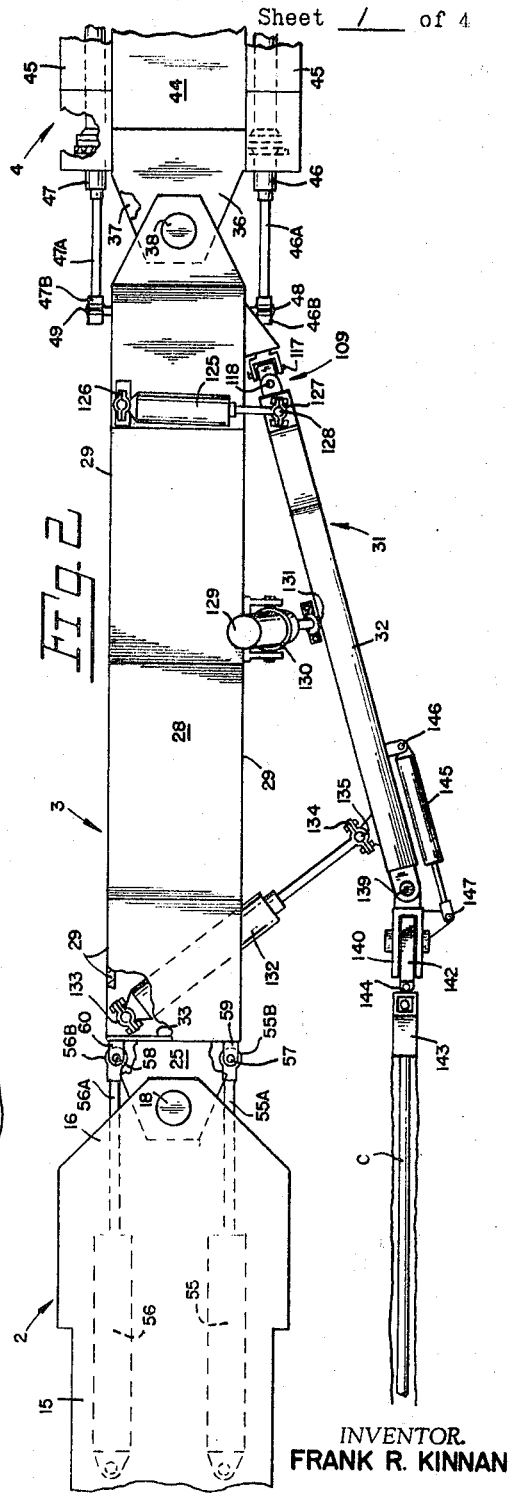
INVENTOR.
FRANK R. KINNAN
BY
AGENT

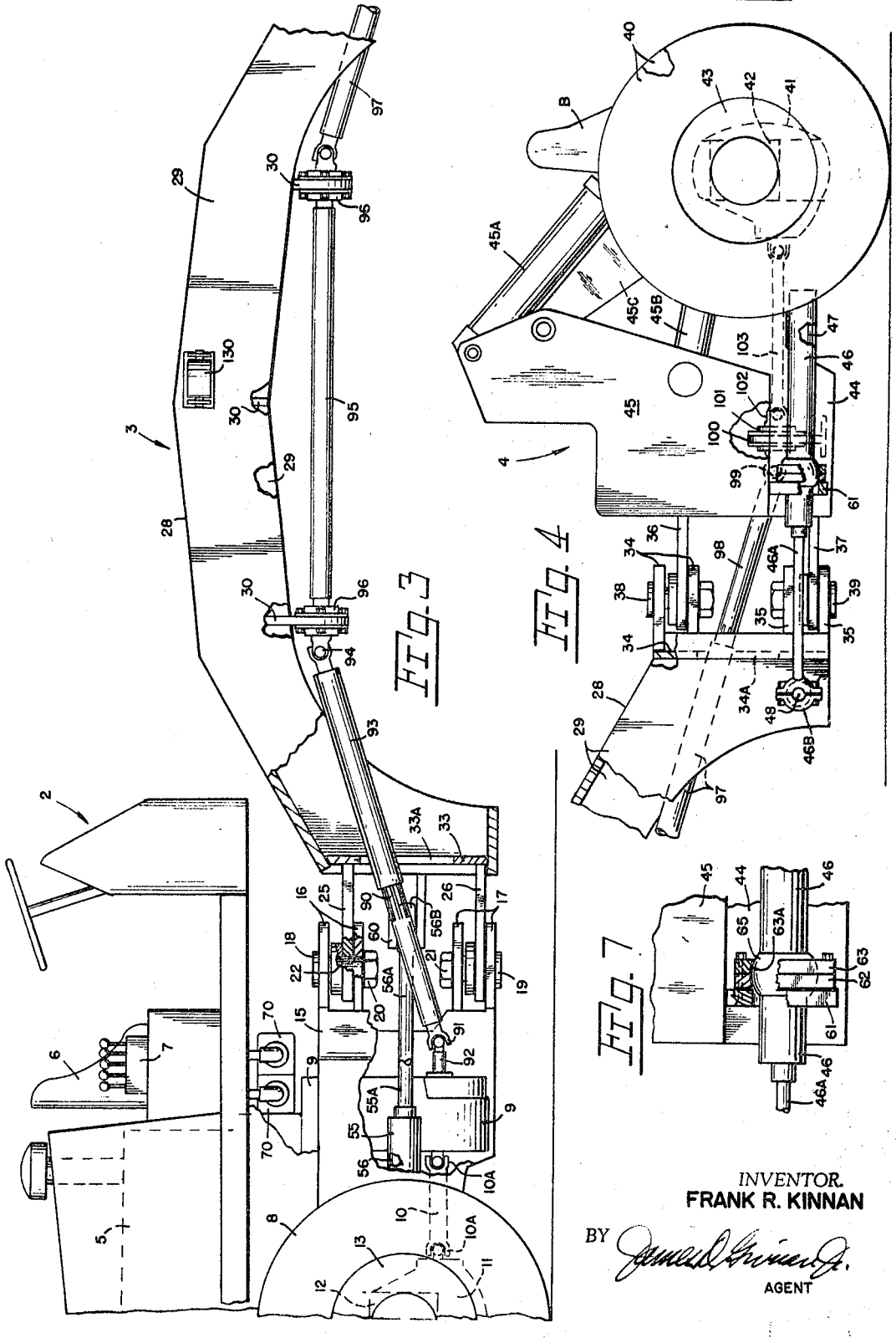

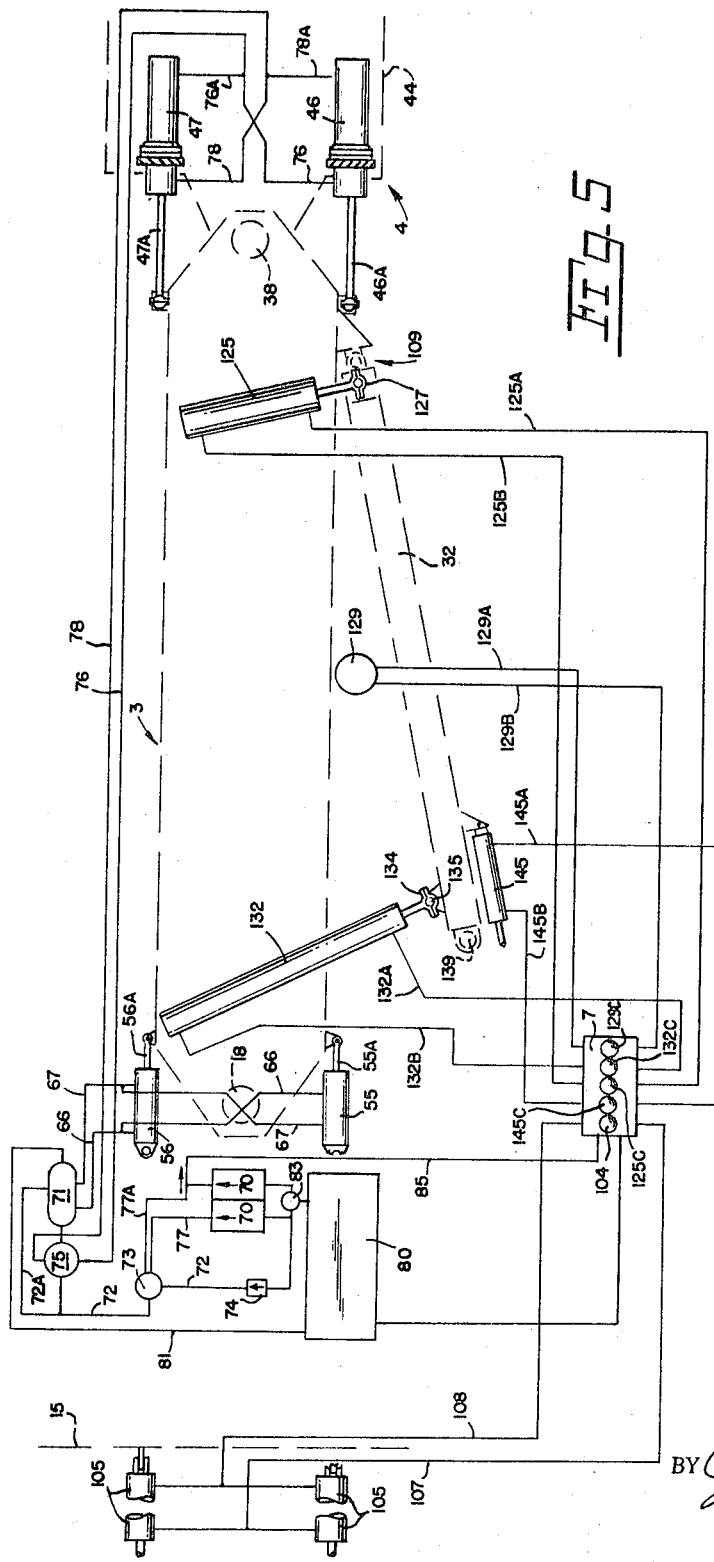

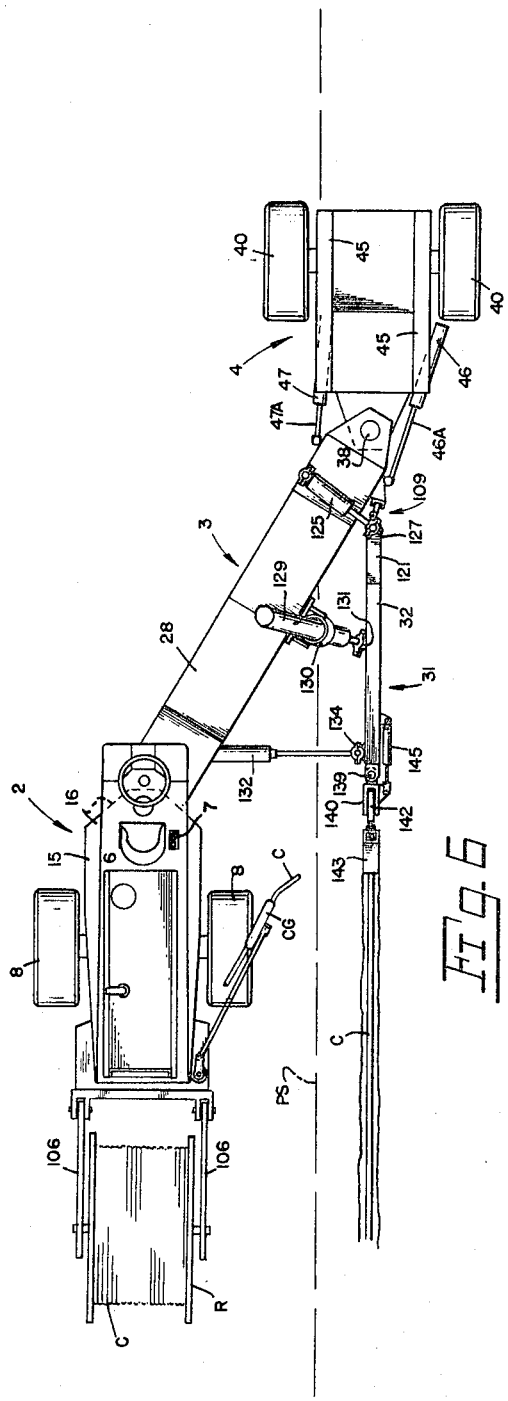

ABSTRACT OF THE DISCLOSURE

The present disclosure concerns a wheel supported vehicle having forward, center and rear sections with each section being pivotally connected with its adjacent section for steering movement about the connection. An earth working instrument is disclosed in the form of a cable plow apparatus carried by the vehicle's center section and may be advantageously deployed because of the articulated nature of the vehicle. The wheels of the vehicle are shown to be powered by drive components which include a drive line extending intermediate the forward and rear sections.

---

This invention relates generally to self-powered vehicles and more particularly to a highly maneuverable, articulated vehicle capable of providing a base for cable laying apparatus in addition to carrying other earth working implements.

An important object of the present invention is the provision of a mobile base for earth working equipment wherein a segmented chassis may be angulated to permit a straight draft connection with a side mounted plow apparatus to most efficiently draw the same through the ground. It is well known that in cable laying operations the motive force required to draw the cable plow through the ground is considerable and usually provided by a track-laying type tractor. The drag exerted by the cable plow on the tractor in an asymmetrical manner adversely affects the vehicle's normal steering and particularly so when the attachment point is offset from the axis of the vehicle's path. Accordingly, it is a present object to provide a vehicle wherein the drag or attachment point may be symmetrically disposed relative to at least one pair of the vehicle's driving wheels.

A further important object of this invention is to provide a vehicle having a chassis including longitudinally spaced apart pivot points joining sections of the chassis to permit selective disposition of each of the segments about such points by powered means. For all practical purposes, the maneuverability of any conventional wheeled vehicle is related directly the wheelbase thereof. Obviously, the provision of pivot points (having vertical axis) intermediate the front and rear axles of the vehicle will substantially reduce the vehicle's turning radius.

Another important object of this invention is the novel steering system wherein the vehicle operator may selectively steer the chassis sections or members about the first or second steering axis or a combination thereof by means of hydraulic cylinders and controls therefor, the cylinders being coupled to the vehicle sections.

These and other objects will become subsequently apparent upon a reading of the following specifications and drawings referred to therein in which:

FIGURE 1 is a side elevational view of the vehicle embodying the present invention.

FIGURE 2 is a plan view of the vehicle's center section and associated parts taken along irregular line 2—2 of FIGURE 1.

FIGURE 3 is a fragmentary side elevational view of the vehicle on an enlarged scale with the cable laying equipment removed.

FIGURE 4 is a view similar to FIGURE 3 showing the forward end of the vehicle.

FIGURE 5 is a schematic drawing of the vehicle's hydraulic system.

FIGURE 6 is a plan view of the vehicle with the cable laying apparatus located along the axis of the path of the vehicle's forward section.

FIGURE 7 is a fragmentary view of one forward steering cylinder and mounting means therefor.

FIGURE 8 is an enlarged view of the universal attachment for the cable laying apparatus.

With continuing reference to the drawings wherein like reference numerals indicate like parts and particularly FIGURE 1 thereof the reference numeral 1 indicates generally a vehicle made in accordance with the present invention. Indicated generally at 2 is the rearward section of the vehicle while similarly indicated at 3 and 4 are the vehicle's center and forward sections.

*Structural components*

The rearward section 2 houses an engine 5, an operator's station 6, the latter being provided with conventional engine and transmission controls (not shown) and a bank of hydraulic valve controls 7 as hereinafter more fully described. A rear pair of driving wheels 8 are selectively engaged with engine 5 through a transmission 9 (FIGURE 3), driving through a drive shaft 10, universally fitted at 10A, differential 11 and fixed rear axle assembly 12. Hubs, one of which is indicated at 13, are preferably of the type incorporating a conventional planetary drive mechanism. The engine and drive train above described are well known in the art and hence require no detailed recitation of their structure or operation.

A frame or chassis 15 of the rearward section 2 is best shown in FIGURE 3 and in addition to providing a base for engine 5 carries upper and lower pairs of forwardly projecting plates indicated respectively at 16 and 17. The aforementioned plates in turn carry pivot pin assemblies 18 and 19 each retained by nut elements 20 and 21. The pin assemblies include suitable wear resistant bushings as at 22 to permit pivotal movement relative to rearwardly extending flanges 25 and 26 carried by the center section 3 thus constituting a first steering axis.

Center section 3 comprises an arch-like elongate beam of welded steel construction closed along its top 28 and sides 29 and provided intermittently along its length with internal webs or crossplates 30 for purposes of rigidity. The center section is shown provided with a cable plow apparatus similar to that shown in my copending patent application Serial No. 467,490 now U.S. Patent 3,307,363, the apparatus being indicated generally at 31, including an elongated member 32 and associated hydraulic cylinders all hereinafter described in detail. The forward as well as the rearward end of center section 3 terminates in vertical plates 33–34 each having an opening 33A–34A (FIGURES 3 and 4) provided therein for passage of drive line members as later described. Plate 34 at the forwar end carries upper and lower spaced apart pairs of plates 34 and 35 which similarly to the first described pairs of plates 16 and 17 receive plates 36 and 37 projecting rearwardly from forward section 4 for pivotal connection by pivot pin assemblies 38 and 39 also similar to the aforementioned pin assemblies. The common vertical axes of pin assemblies 38 and 39 constitute a second steering axis about which the forward and center sections may swing.

Although not shown in the drawings, center section 3 additionally may serve as a base for a conventional circle and moldboard assembly of the type normally carried by a road grader machine.

Forward section 4 is supported at its front end by a forward pair of driving wheels 40 driven through a differential 41, fixed axle assembly 42 and hubs 43 each the latter preferably included planetary drive mechanisms identical to the rear hubs 13. The axle assembly 42 is carried by the forward section's frame 44 which is of welded box construction. A pair of upwardly extending frame members 45 are provided in lateral spaced apart relationship upon frame 44 and thereat support within suitable bushings, pairs of hydraulic lift and dump cylinders 45A–45B and linkage 45C associated with a front mounted earth carrying bucket. The last mentioned cylinders and bucket, as such constitute no part of the present invention.

Steering system

Carried below the upright members 45 and universally mounted to the frame 44 are a pair of horizontally disposed hydraulic cylinders 46 and 47 having piston rods 46A–47A coupled to the forward end of center section 3 for steering forward section 4 about the second steering axis as later described. Sockets indicated at 46B–47B are in bolted engagement with ball fittings 48–49 carried by the center section 3. Each cylinder 46–47 is of the double acting type being provided with conduits as later described. Further, cylinders 46–47 are each mounted within rings of the type indicated at 61 (FIGURE 7) by cooperating bearing members (62–63 having internal annular bearing surfaces arcuate in section as at 63A for retention of a correspondingly shaped ring 65 carried by cylinder 46.

The steering system also includes a rear pair of hydraulic cylinders 55–56 hingedly mounted to frame 15 (FIGURE 2) for horizontal swinging movement and laterally offset an equal distance from the frames longitudinal centerline. Their piston rods indicated at 55A–56A terminate in suitable bearings 55B–56B which in turn receive pins 57–58 carried by brackets 59–60 welded to plate 33 of center section 3. Accordingly relative movement of the sections 2 and 3 about the first steering axis is provided by alternate expansion and contraction of the hydraulic cylinders 55–56 as follows.

The rear hydraulic cylinders 55–56 are also of the double acting type supplied by fluid conduits 66 and 67, (FIGURE 5) each conduit being alternately in communication with the mounting end of one cylinder and oppositely with the rod end of the other cylinder. Depending upon the desired direction of turn, fluid pressure simultaneously, by valve means later described, extends one piston thereof while being exhausted from the other cylinder to permit retraction of its piston rod.

A primary source of fluid pressure for the front and rear steering cylinders is provided by an engine driven hydraulic pump 74 which through line 72 and branch line 72A provides pressure to first, an orbital steering valve 75 for controlling the front cylinders 46–47 and provided secondly to a three position valve 71 in circuit with the rear cylinders 55–56. A secondary fluid pressure source is provided both valves 75 and 71 via a line 77 from one of two main tandem hydraulic pumps 70 the flow of which is controlled through a pressure demand valve 73 which admits supplementary fluid pressure generated by one of the pumps 70 necessary at low engine speeds. A reservoir indicated at 80 is connected by a return line 81 with valves 71 and 75.

The orbital valve 75 controlling cylinders 46–47 permits manual and precise control of pressurized fluid into either line 76 or 78 while simultaneously allowing a return flow through the opposite unpressured line to accurately steer forward section 4 about the second (forward) steering axis.

A fluid shut-off valve 83 is manually positionable to direct hydraulic fluid to the main pumps 70 and the steering pump 74.

Drive components

As previously described, the rear pair of wheels 40 are driven through the transmission 9 and a drive shaft 10 having universal joints 10A. A forwardly extending drive line for powering the forward pair of wheels 40 includes tube component indicated at 90, universally jointed at 91 to a transmission power output shaft 92 and at its forward end being in splined, telescopic engagement with a second drive tube member 93. Member 93 is in turn universally supported at its end at 94 by one end of a drive shaft 95 journalled adjacent its ends within bearing assemblies 96. The crossplates 30 carry the bearing assemblies within annular openings (not shown) provided therein.

The aforementioned drive line further includes a forward drive tube 97 which is in telescopic, splined engagement with a second drive tube 98, the latter terminating forwardly in a universal joint component 99. A bearing support 100 is carried by the frame 44 of the forward section and retains a bearing 101 in which a stub shaft 102 is journalled. Rotation imparted to shaft 102 is transmitted by a drive shaft 103 to the differential 42 and ultimately the planetary hubs 43.

Cable plow apparatus

The cable plow apparatus, indicated generally at 31, is positionable by means of hydraulic cylinders as follows: The main hydraulic pumps 70 are in circuit via conduit 85 to the bank of hydraulic valve controls 7 comprising an assembly of five spools each having three positions. Four of the five spools of the valve assembly 7 control independently the pressurized flow of fluid to hydraulic cylinders associated with the cable plow apparatus 31 while the fifth spool 104 controls fluid flow to a pair of rearwardly extending hydraulic cylinders 105 carried by section 2 and associated with pivotally mounted arms 106 supporting a reel R of cable or conduit material C. A pair of hydraulic conduits 107–108 interconnect respectively the rod end and mounting end of cylinders 105 with the valve assembly 7 to permit cylinder extension or retraction to raise or lower the arms 106 during reel loading.

With particular reference to the cable plow apparatus indicated generally at 31 and more fully described in the aforementioned patent, the elongated member 32 trails rearwardly from the forward end of the center section 3 and is attached thereto by universal attachment means indicated generally at 109.

As shown on an enlarged scale in FIGURE 8, the universal attachment means 109 includes a thrust bearing 110 secured intermediate two of the stiffeners 111–112 welded to side plate 29. This axis of the bearing 110 and the longitudinal axis or centerline of the center section 3 define an angle of approximately fifteen degrees which will vary somewhat in other vehicle installations. Rotatably carried within the thrust bearing 110 is a shaft 113 threaded at its forward end to receive a nut 114 and terminating at its opposite end in a yoke formed by a pair of arms 115 providing part of a universal joint which further comprises an intermediate universal member 116 adapted for movement about the normally horizontal axis of a pivot pin 117 which pivotally secures the member 116 with the arms 115. A second pivot pin 118 extends downwardly through the intermediate universal member 116 adjacent its rearward end to provide a substantially vertical pivot for the apparatus' elongated member 32. Pin 118 is carried by a clevis plate 120 secured to an upwardly extending arm 121 integral with the forward end of member 32. Tilting movement of elongated member 32 is permitted by movement of shaft 113 within bearing 110.

A first hydraulic cylinder 125 for tilting member 32 is mounted above and in crosswise relationship to center section 3 with its cylinder end socket mounted as at 126 for pivotal movement and similarly its rod end being provided with a socket 127 in engagement with a ball 128 carried at top end of arm 121. A second actuating cylinder 129 for member 32 is mounted in an upright manner to one side of section 3 in a gimble 130, the lower end of its piston rod being attached at 131 to member 32 intermediate the ends thereof for imparting vertical movement thereto about the axis of pivot pin 117.

Coupled adjacent the rearward end of member 32 is a third hydraulic cylinder 132 provided with a pivotal socket mounting 133 at its cylinder end to center section 3 and similarly mounted at its rod end at 134 to a ball 135 affixed to the inboard side of member 32. Actuation of cylinder 132, as later described positions in a swinging manner the member 32 about the normally upright axis of pin 118.

A cable plow including a blade holder 140 is hingedly attached at 141 by pin 139 to the trailing end of the elongated member 32 of the cable plow apparatus and adjustably retains an upright earth penetrating blade 142. A cable shoe 143 is in turn hingedly carried at 144 by the blade 141 extending the length thereof. The cable shoe 143 is of box-like construction in section through which the cable or conduit being laid is guided downwardly for deposit within a trench formed by blade 142.

The cable laying apparatus 31 includes a fourth hydraulic cylinder 145 swingably attached at its cylinder end at 146 to the member 32 and extending rearwardly therefrom with its piston rod terminating in pivoted attachment at 147 with the blade holder 140. Accordingly gradual swinging movement about the upright axis of pin 139 may be imparted to the blade holder 140.

The hydraulic cylinders 125, 129, 132 and 145 are of the double acting type and served by pairs of hydraulic lines 125A–125B, 129A–129B, 132A–132B, and 145A–145B which in turn are in circuit with the main hydraulic pumps 70 through independent spools 125C, 129C, 132C, and 145C of the valve assembly 7. Accordingly fluid pressure directed to the cylinder by selective actuation of its corresponding spool will extend, hold and retract the cylinders piston rods to position the elongated member 32 of the cable laying apparatus about a plurality of axes as permitted by the universal attachment means 109. In view of the foregoing, the cable plow carried by the member 32 may be placed at desired lateral and vertical distances from center section 3 and additionally by tilting of member 32 by cylinder 125 at various inclined relationships to the ground surface.

Operation

Although described in association with a cable laying apparatus, it will be understood that the novel construction disclosed provides a highly maneuverable vehicle which may serve as a base for other earth working implements one such other by way of example, being a moldboard.

In proceeding along a roadway to or from a worksite, the vehicle may be steered by activation of the forward steering cylinders 46–47 through orbital steering valve 75 to move the forward section 4 about the vertical axes of pivot pins 38–39. Also, the cable laying apparatus 31 is elevated by means of hydraulic cylinder 129 for such roadway travel with the blade 142 upwardly re-positioned within its holder 140 to clear the roadway.

In a typical cable laying operation the sections of the present vehicle may be advantageously configured as shown in the plan view of FIGURE 6 wherein the projected centerlines of vehicle sections 2 and 4 are in mutual parallel relationship to the vehicle's path while the centerline of section 3 is in diagonal relationship to said path and centerlines. Such positioning of center section 3 permits elongated member 32 of the apparatus 31 to be disposed medially of an extended centerline of the forward vehicle section 4 resulting in a straight draft connection. Accordingly, upon the cable laying apparatus being offset from section 3 by its associated hydraulic cylinders 125, 129 and 132 a line of draft is established substantially in a plane containing the extended centerline of vehicle section 4, whereby the draft load exerted upon forward section 4 is done so in a symmetrical manner. Hence, forward section 4 and driving wheels 40, during cable laying operations, are disposed in a straight ahead manner with no tractive power being dissipated for directional corrections as would be the case in cable laying vehicles wherein the cable laying apparatus is laterally offset from the vehicle's single longitudinal centerline.

The rear vehicle section 2 may, in a normal cable laying operation travel upon a paved surface indicated at PS providing maximum traction of the driving wheels 8 while the forward driving wheels 40 may be off or partially on said surface, depending on the spaced location of the course of electrical cable from the edge of the paved surface.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. An articulated wheel supported vehicle of the automotive type comprising in combination,
  a plurality of normally aligned vehicle sections including a front, center and rear section with said front and rear sections having ground engaging wheels,
  a vehicle operator's station located on said rear section,
  pivot means connecting each of said sections with its adjacent section and permitting the longitudinal centerline of each section to move relative to the like centerline of its adjacent section,
  an engine carried by said rear section and having a driving connection with said wheels supporting said front and rear section,
  powered means coupling each of said sections with its adjacent section for imparting steering movement to said sections about said pivot means,
  an earth working instrumentality trailed by and movable by means of hydraulic cylinders relative to said center section and hence substantially in the forward field of vision of the operator, and
  valve control means on said rear section for manipulation by the vehicle operator for selectively energizing said powered means and said cylinders to enable accurate guiding of said instrumentality along a desired path.

2. The vehicle as claimed in claim 1 wherein said driving connection includes a forwardly directed drive line having components in splined, telescopic engagement at both of the ends of said drive line.

3. An articulated, wheel supported vehicle of the automotive type comprising in combination,
  a plurality of normally aligned vehicle sections including a front, center and rear section supported upon ground engaging wheels,
  a vehicle operator's station located on said rear section,
  pivot means interconnecting each of said sections with its adjacent section and permitting the longitudinal centerline of each section to move relative to the centerline of its adjacent section,
  an engine carried by said rear section and having a driving connection with said wheels,
  powered means coupling each of said sections with its adjacent section for imparting steering movement to said sections about said pivot means,
  control means at the operator's station for selectively energizing said powered means, and
  an earth working instrumentality carried by said center section and constituting a cable laying apparatus, said apparatus comprising an elongated member laterally offset from the centerline of said center section, said member trailing rearwardly relative to the forward end of said center section, pivot means carried by said center section and mounting the forward end of said member thereto allowing lateral and downward swinging movement of said member, a cable plow hingedly attached to the opposite end of said member, hydraulic cylinders coupled with said member and with said center section for imparting swinging movement to said member whereby said cable plow may be selectively positioned relative to and offset from the centerline of said center section.

4. An articulated, wheel-supported vehicle of the automotive type comprising in combination, normally aligned front, center and rear vehicle section, said front and rear sections supported upon ground engaging wheels, forward pivot means and rearward pivot means interconnecting respectively said front and center sections and said center and rear sections permitting steering movement of said sections, an engine carried by one of said sections having driving connection with said ground engaging wheels, first powered means coupled to said front and center sections for imparting steering movement to said front section about said forward pivot means, second powered means coupled to said center and rear section for imparting steering movement to said center section about said rearward pivot means, control means for energizing said first and second powered means for steering movement of said front and center sections respectively about said forward and rearward pivot means to thereby angularly offset the centerline of each of said sections from that of its adjacent section, and an earth working instrumentality carried by said center section and constituting a cable laying apparatus, said apparatus comprising an elongated member laterally offset from the centerline of said center section, said member trailing rearwardly relative to the forward end of said center section, pivot means carried by said center section and mounting the forward end of said member thereto allowing lateral and downward swinging movement of said member, a cable plow hingedly attached to the opposite end of said member, and said means for positioning said instrumentality includes hydraulic cylinders coupled with said member and with said center section for imparting swinging movement to said member whereby said cable plow may be selectively positioned relative to and offset from the centerline of said center section.

References Cited

UNITED STATES PATENTS

| | | | |
|---|---|---|---|
| 2,494,324 | 1/1950 | Wright | 37—156 |
| 2,766,536 | 10/1956 | Perkins. | |
| 2,883,774 | 4/1959 | Clifford | 37—156 X |
| 2,952,929 | 9/1960 | Lindberg. | |
| 3,170,300 | 2/1965 | Kelley | 61—72.6 |
| 3,232,358 | 2/1966 | Heiberg | 61—72.6 X |

EARL J. WITMER, *Primary Examiner.*

U.S. Cl. X.R.

172—781